United States Patent [19]

Padera et al.

[11] Patent Number: 5,066,393
[45] Date of Patent: Nov. 19, 1991

[54] SLOTTED FLOW COLLECTOR/DISTRIBUTOR FOR WATER TREATMENT TANK WITH ONE-WAY VALVES

[75] Inventors: Robert F. Padera, Libertyville; Daniel C. Miller, Glenview, both of Ill.

[73] Assignee: Culligan International Company, Northbrook, Ill.

[21] Appl. No.: 483,810

[22] Filed: Feb. 23, 1990

Related U.S. Application Data

[63] Continuation-in-part of Ser. No. 400,866. Aug. 28, 1989, abandoned.

[51] Int. Cl.⁵ .............................................. B01D 21/24
[52] U.S. Cl. .................................... 210/136; 137/590; 137/605; 137/883; 138/37; 210/279; 210/291
[58] Field of Search ............... 137/110, 605, 846, 883, 137/602, 590; 210/136, 275, 279, 289, 291, 678, 793, 670, 456; 138/37, 121, 173, 178; 405/49

[56] References Cited

U.S. PATENT DOCUMENTS

| 3,279,610 | 10/1966 | Scholten et al. | 210/289 |
| 3,374,634 | 3/1968 | Fochler | 405/49 |
| 3,384,240 | 5/1968 | Berardi | 210/279 |
| 3,699,684 | 10/1972 | Sixt | 405/49 |
| 3,830,373 | 8/1974 | Sixt et al. | 210/497.01 |
| 3,874,805 | 11/1974 | Voedisch | 210/291 |
| 4,013,556 | 3/1977 | Evans | 210/291 |
| 4,024,894 | 5/1977 | Drossbach | 138/121 |
| 4,113,818 | 9/1978 | Drossbach | 405/49 |
| 4,163,619 | 8/1979 | Fales | 405/49 |
| 4,193,868 | 3/1980 | Meyers | 210/678 |
| 4,524,805 | 6/1985 | Hoffman | 137/846 |
| 4,773,998 | 9/1988 | Heinrich | 210/279 |

FOREIGN PATENT DOCUMENTS

| 136002 | 6/1979 | Fed. Rep. of Germany | 210/289 |
| 483461 | 12/1975 | U.S.S.R. | 137/590 |
| 1005552 | 12/1963 | United Kingdom | 137/178 |
| 2094443 | 9/1982 | United Kingdom | 137/846 |

Primary Examiner—Robert A. Dawson
Assistant Examiner—Joseph Drodge
Attorney, Agent, or Firm—Gerstman & Ellis, Ltd.

[57] ABSTRACT

A flow collector/distributor for a water treatment tank comprises a housing proportioned to communicate through a wall of the water treatment tank to provide flow communication between the tank interior and the tank exterior. The collector/distributor defines an inner end to project inwardly from the tank wall and an outward end to face outwardly from the tank wall. A plurality of slots are defined in the tubular housing, positioned to communicate with the tank interior when the collector/distributor is seated in the tank wall. The slots are of a width which is narrow enough to permit water flow therethrough while substantially preventing passage therethrough of water treatment material present within the tank. One or more one-way valves are provided to permit water flow through all of the slots from the tank interior through the collector/distributor to the tank exterior, but to prevent water flow through some, but not all, of the slots from the tank exterior through the collector/distributor to the tank interior. Also, a novel slot design is disclosed having improved flow characteristics.

30 Claims, 2 Drawing Sheets

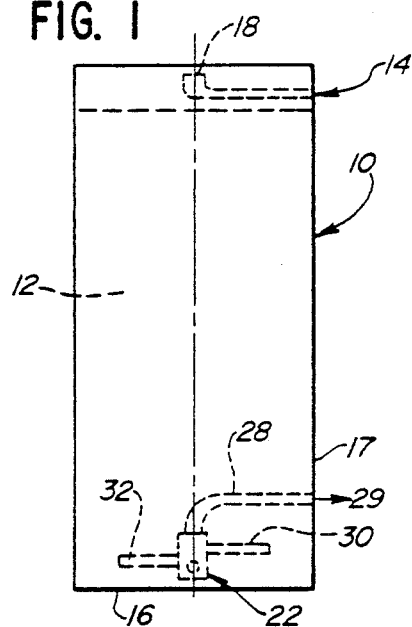
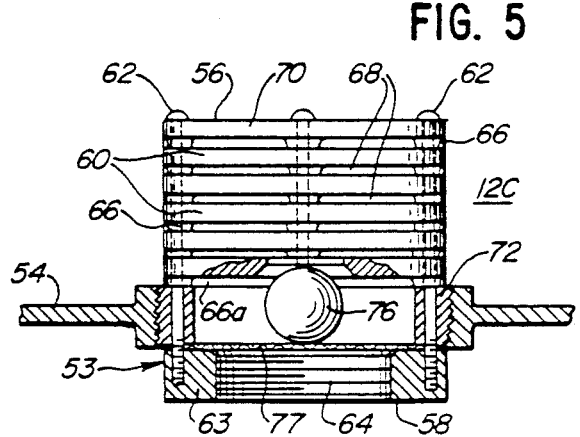
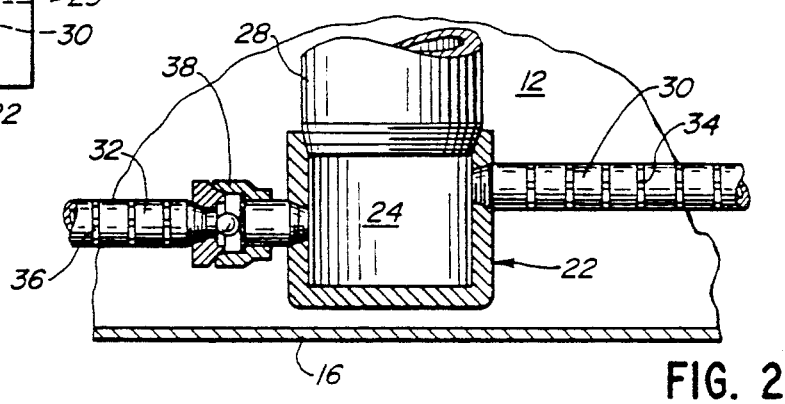
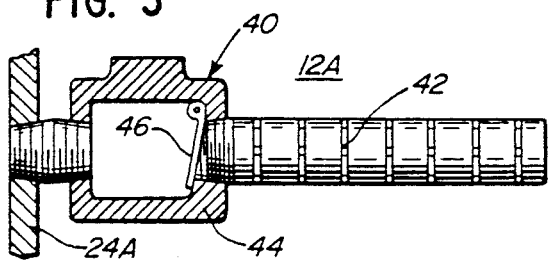
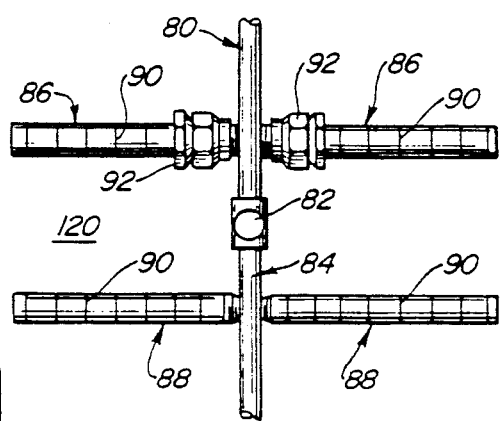
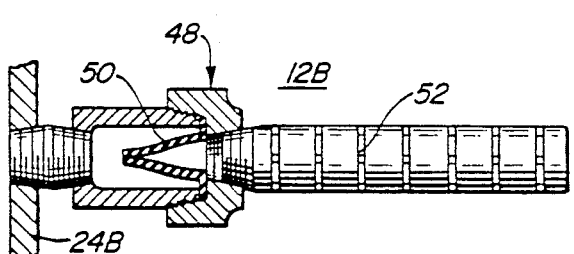

SLOTTED FLOW COLLECTOR/DISTRIBUTOR FOR WATER TREATMENT TANK WITH ONE-WAY VALVES

CROSS REFERENCE TO RELATED APPLICATION

This is a continuation-in-part of U.S. application Ser. No. 400,866, filed Aug. 28, 1989 now abandoned.

BACKGROUND OF THE INVENTION

The successful use of water treatment tanks requires not only proper water flow through the tank for treatment, but also proper reverse flow for backwashing, to obtain the best regeneration, air mixing, and separation of water treatment media. The backwashing step is conventionally used to clean the mineral of suspended solids and to loosen the bed for efficient regeneration of the ion exchange materials.

It is typical that the backwash and regeneration flow rates through a water treatment tank are substantially less than the maximum water flow rate through the tank when it is in service. Thus, tank inlet and outlet ports which are adapted for a normal service flow rate may exhibit flow disadvantages during the backwash step, in which flow through the inlet and outlet of the tank is typically reversed. For example, it is desired for the flow velocity of water coming into the tank during the backwash step to be above a certain minimum velocity, to cause separation by movement of the water treatment media in the tank. In the prior art, this is not easily done, while at the same time maintaining an adequate flow capacity through the inlet and outlet, to provide the desired maximum flow for the water treatment tank during its service cycle.

Also, as another issue, it is highly desirable for the water treatment media to remain trapped in the tank so that media particles do not flow out of the tank along with water passing therethrough.

By this invention, a flow collector/distributor is provided which addresses both of these needs. The flow collector/distributor of this invention is typically used as the flow outlet during normal operation but as the flow inlet during the backwash, while effectively limiting the migration of water treatment media from the tank. At the same time, the flow collector/distributor may provide an increased backwash flow velocity into the tank, even when the total flow volume of backwash solution is less than the normal flow. This is accomplished by the automatic reduction of the number of flow orifices in reverse flow, when compared with normal flow, for a consequent increase in the flow velocity of solution through the flow collector/distributor in reverse flow.

Also, a slot system in a housing for improved flow of water into or out of the housing is disclosed, where the presence of partially blocking granular media cannot seriously restrict the flow which passes through the slot system in a large plurality of different directions.

DESCRIPTION OF THE INVENTION

The present invention relates to the method of (1) passing water into a water treatment tank through a first flow collector/distributor communicating between the tank exterior and interior, while withdrawing treated water from the tank through a second flow collector/distributor. Thereafter, (2) one back flushes the tank by passing an aqueous solution, such as water or brine, into the tank through the second flow collector/distributor, and withdrawing water stored in the tank through the first flow collector/distributor.

In accordance with this invention, one passes water from the tank through the second flow collector/distributor to the exterior through a plurality of apertures. Thereafter, in the backflushing mode, one passes water from the exterior through the second flow collector/distributor into the tank through a number of the apertures which is less than the full plurality of said apertures, so that a lower backflush flow rate may still have a desired flow velocity.

The apertures are proportioned to permit water flow therethrough, while substantially preventing passage of particles of water treatment material which are carried within the tank.

The second flow collector/distributor preferably comprises a housing which communicates through a wall of the water treatment tank to provide flow communication between the tank interior and the tank exterior. The second flow collector/distributor defines an inner end projecting inwardly from the tank wall, and an outer end facing outwardly from the tank wall. A plurality of slots are defined in the housing, serving as the apertures described above, which slots are positioned to communicate with the tank interior with the collector/distributor seated in the tank wall. The slots are of a width which is narrow enough to permit water flow therethrough, (including flow of optionally used regenerating solution) while substantially preventing passage therethrough of water treatment material present in the tank.

A typical water treatment material which may be present is a mixed bed ion exchange resin, or any desired ion exchange resin of the cationic or anionic type. Additionally, other water treatment media may be utilized, without limitation, as may be desired.

One way valve means are provided to the flow collector/distributor, the one-way valve means permitting water flow through all of the housing slots from the tank interior through the collector/distributor to the tank exterior. However, the one-way valve means prevents water flow through some but not all of the slots from the tank exterior through the collector/distributor to the tank interior. Typically, the one-way valve means closes off reverse flow from the tank exterior through the collector/distributor to the tank interior in a majority of the slots, so that the flow velocity on backwash may be significantly increased over what it otherwise would normally be if such backwash flow took place through all of the slots present in the flow collector/distributor.

The one-way valve means may comprise one or more one-way valves of any desired type, for example, ball type check valves, swinging partition-type check valves, duck-bill check valves, or any other desired, spontaneously-working check valve.

The flow collector/distributor of this invention may be of a variety of different designs. For example, the housing may comprise a cylindrical structure having a series of spaced, substantially annular slots positioned in transverse manner along the flow collector/distributor. This may be accomplished by forming the housing from a stack of secured rings, the rings defining the slots between them. In this circumstance, preferably, the one-way valve means is positioned to control water flow through the majority of the slots to provide the results described above.

Alternatively, the housing may comprise a central manifold chamber connected to a plurality of flow conduits which extend radially outwardly from the manifold chamber. The radial flow conduits each define a number of slots, typically a plurality of slots in each flow conduit. At least one of the flow conduits, and preferably more than one, also carry one-way valve means to control the water flow through its own slots in the manner and for the purposes described above.

In a third embodiment of the flow collector/distributor of this invention, the housing may comprise a central manifold header conduit connected to lateral flow conduits. A plurality of the lateral flow conduits, and typically all of them, each define a number of slots, typically a plurality of slots for each, with some of the lateral flow conduits carrying one-way valve means for the purpose described above.

It is generally preferable for the slots in the flow collector/distributor to have a width on the order of 0.005 to 0.03 inch, preferably about 0.01 to 0.015 inch. However, the invention may be practiced making use of other slot or orifice sizes, depending upon the particle or grain size of the water treatment media present in the tank. A major purpose for the narrow width of the slots is to prevent passage of water treatment media material. Therefore, if the water treatment media material is retained in the tank by some other means, the slots or other apertures used in accordance with this invention may be of larger dimension.

The invention of this application also relates to water treatment apparatus comprising a housing having a wall with at least one slot for flow communication between the housing exterior and interior. By the improvement of this invention, the slot defines an outwardly facing slot portion of less depth than the thickness of the wall, and at least one aperture extending from the slot portions completely through the housing wall to provide flow communication between the outer slot portions and the interior of the housing. Thus, the slot portion serves as a collecting area for flow either inwardly or outwardly through the aperture, so that the presence of granular material adjacent the aperture can have only a minor flow-blocking effect.

Preferably, the above-described slots are annular in shape, and define a plurality of apertures which are in spaced relation to each other. For example, two apertures may be provided in an annular slot portion which surrounds a cylindrical housing portion, with the apertures being positioned 120 degrees apart. Alternatively, a pair of apertures may be positioned 180 degrees apart, or three apertures positioned 120 degrees apart, in each annular slot. Alternatively, the slots do not have to be annular, but can extend along a flat surface, with apertures being distributed within the slots.

DESCRIPTION OF DRAWINGS

In the drawings,

FIG. 1 is a schematic view of a water treatment tank which carries the flow collector/distributor of this invention.

FIG. 2 is a fragmentary, enlarged view, taken partly in section, of the flow collector/distributor of FIG. 1.

FIG. 3 is a fragmentary elevational view, taken partly in section, of another embodiment of a radial flow conduit of a flow collector/distributor of this invention similiar to FIG. 2, shown to be mounted in a water treatment tank.

FIG. 4 is a fragmentary, elevational view, taken partly in section, of a radial flow conduit of a flow collector/distributor similar to FIG. 2, with the radial conduit carrying a different type of one-way valve means.

FIG. 5 is a fragmentary, elevational view, taken partly in section, of another embodiment of flow collector/distributor in accordance with this invention.

FIG. 6 is a plan view of another embodiment of flow collector/distributor in accordance with this invention.

DESCRIPTION OF SPECIFIC EMBODIMENTS

Figure 8:
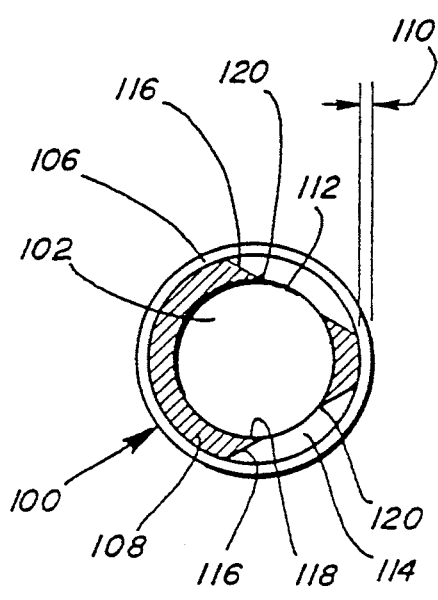
FIG. 8 is a sectional view taken along line 8—8 of FIG. 7.

Referring to FIG. 1, a water treatment tank 10 is disclosed, which may be of conventional design, except as otherwise indicated herein. Tank 10 is filled with typically granular water treatment media 12, for example, ion exchange resins for water softening or deionization. A first, inlet flow collector/distributor 14 is provided for communication through a side wall of the tank. First flow collector/distributor 14 may be of conventional design, and may extend into tank 10 and terminate with an upwardly-facing port 18.

Tank 10 also carries a second, outlet flow collector/distributor 22 which may be of a design in accordance with this invention. Thus, raw water enters the water treatment tank through inlet 14, being conveyed through port 18, to the flow through media 12 toward bottom wall 16 of the tank. From there, the water is collected by second flow collector/distributor 22 and conveyed from second collector/distributor 22 by any conventional means to a site of use.

Referring to FIG. 2, a detailed view of second flow collector/distributor 22, mounted in tank side wall 17, is shown. Flow collector/distributor 22, comprises a central manifold chamber 24, which may be attached to conduit 28, which is carried at wall 17. Conduit 28 may be connected at its end 29 in conventional, branched manner with suitable valving to (1) a receptacle for processed water and (2) a source of backwashing or regenerating solution for example brine, for alternative flow paths.

Flow collector/distributor 22 also comprises several radially extending flow conduits 30, 32 which communicate at their inner ends with manifold chamber 24. Typically, from 2 to 16 radially disposed flow conduits may be provided, although any desired number may be used. Flow conduits 30 and 32 are to be considered as merely representative of the typically larger number of radially disposed flow conduits present.

Both of flow conduits 30, 32 typically have closed outer ends, and define a length of piping which carries a plurality of circumferentially extending slots 34, 36, which slots provide flow communication between the area containing water treatment media 12, and the interior of the respective radial flow conduits 30, 32 plus the interior of central manifold chamber 24.

The width of slots 34, 36 is typically about 0.012 inch, sufficient to permit the easy flow of water through slots 34, 36, but sufficiently narrow to substantially prevent the migration of water treatment media 12 through the slots.

Radial flow conduit 32 defines a conventional ball-type check valve 38 positioned radially inwardly of the tubing portion which defines slots 36. Accordingly, radial flow conduit 32 permits radially inward flow of water from slots 36 into central manifold chamber 24, but reverse flow is prevented. However, radial flow conduit 30 does not have such a check valve, so that flow can pass in either direction through that particular flow conduit.

Typically at least half of the radial flow conduits present will be of the design of radial flow conduit 32, while typically no more than half of the flow conduits present will be of the design of flow conduit 30 so that when reverse flow from conduit 28 and manifold chamber 26 is proceeding radially outwardly through the flow conduits, such flow takes place through only one half or less of the conduits. The effect of this is to relatively increase the flow velocity of regeneration solution or the like through slots 34 in the backflush mode, with the increased velocity being typically sufficient to stir up the water treatment media 12, to achieve the known beneficial effects of that action.

Accordingly, in normal operation, the water enters tank 10 through inlet 14, passing through port 18 into the water treatment media 12. The water then percolates downwardly until it is collected into the radial flow conduits 30, 32 by flowing through slots 34, 36. From there, the processed water moves radially inwardly to manifold chamber 24, with the ball check valve 38 being open, following which water passes through conduit 28 for use.

However, during any regeneration cycle in which a regeneration solution is backflushed through the system, the regeneration solution enters manifold chamber 24 from conduit 28, but is only capable of migrating radially outwardly through radial flow conduit 30 and the other conduits identical to it. Check valve 38 prevents backflush solution from migrating outwardly through radial conduit 32 and the others of its type. Thus, in the backflush process, flow collector/distributor 22 has greater flow resistance and less flow capacity, so that the backflush water flows out of slots 34 at a higher velocity than would otherwise be the case if check valve 38 were not preventing back flow through radial conduit 32. The effect of this, as described above, is a higher water flow velocity out of slots 34 for better stirring and disturbing of the media 12 during the backflush process.

Referring now to FIG. 3, a modified design of radial flow conduit 40 is disclosed, being generally similar in purpose and function to radial conduit 32, as a substitute for it.

Radial conduit 40 communicates with the wall of a central manifold chamber 24A in a flow collector/distributor which is identical in structure and function to flow collector/distributor 22 of FIG. 2, except as otherwise shown. As before, the flow collector/distributor has a similar plurality of radially extending flow conduits, including one or more of flow conduits 40 which, as in the previous embodiment, define a series of spaced slots 42 for communication between the interior of radial conduit 40 and the exterior thereof. As before, chamber 24A and radial conduit 40 are positioned within a tank and generally buried in water treatment media 12A.

Radial conduit 40 carries a different type of one-way valve means. Specifically, a typically conventional pivoting flap valve 44 is provided, in which a pivoting flap 46 is positioned to permit radially inward flow through flow conduit 40, but to prevent radially outward flow, for purposes similar to the analogous radial flow conduit 32 in the previous embodiment of FIG. 2.

Turning to FIG. 4, another design of radial flow conduit 48 is disclosed, this variant being also analagous in its function to radial flow conduit 32 of the FIG. 2 embodiment, and serving as a substitute for it. The structure is generally similar to radial flow conduit 32 except that the one-way valve means in this circumstance is a duckbill-type one way valve 50, which may be of conventional design, making use of a tapered, elastomeric tube, and being positioned to permit radially inward flow but to substantially prevent radially outward flow. As in the previous embodiment, slots 52 are provided in the radially outer portions of conduit 48 for flow communication between the interior thereof and the exterior, with radial conduit 48 being typically buried in water treatment media 12B within a water treatment tank. As before, radial conduit 48 communicates at its radially inner end with central manifold chamber 24b of a flow collector/distributor which is similar in design and function to the flow collector/distributor of FIG. 2.

Turning to FIG. 5, another design of flow collector/distributor, typically for use in a water treatment tank, is disclosed. The flow collector/distributor of FIG. 5 defines a housing 53 which is shown to be carried on wall 54 of a water treatment tank, typically the bottom wall. The housing further defines an inner end 56 projecting inwardly from tank wall 54, and an outer end 58 facing outwardly (and typically downwardly) from the tank wall. Housing 53 may be connected to tank wall 54 in a screw-threaded relationship, or attached by any other conventional means.

In this embodiment, a portion of housing 53 which is adjacent inner end 56 comprises a stack of rings 60, rings 60 being held together by bolts 62 which pass through the entire stack of rings 60 and are anchored in outer base portion 63 of housing 53. Outer base portion 63 defines a central aperture 64.

Individual rings 60 each define a series of projections 66 that cause the rings to be largely spaced from each other in the stack, to define a series of slots 68 for a purpose similar to the slots of previous embodiments. The innermost member 70 is a plate rather than a ring, to block longitudinal flow into the device.

Accordingly, when the flow collector/distributor of FIG. 5 is being used as an outlet port in normal operation of a liquid treatment tank, water within tank wall 54 percolates through water treatment media 12c to flow through slots 68 into the interior of housing 53, as defined by the stacked, secured rings 60 and outer base member 63. Outer secured ring 72 may carry screw threads as shown for attachment to the tank wall 54.

The water then flows downwardly around a conventional open ball-type check valve 76 and out of port 64, through a conduit to convey the water to storage or a desired point of use. Screening 77 or other material prevents the ball check valve 76 from falling out of the system.

In the regeneration, backflushing mode of the tank, regeneration solution flows upwardly through aperture 64 to cause the ball check valve 76 to close. Accordingly, in the backflush mode, regeneration solution can only flow through the bottom slot 66a, since access to all of the other slots 66 is blocked by the closed check valve 76. As a result of this, the velocity of flow of regeneration solution through slot 66a is greatly increased over what it would otherwise be at the same flow rate in the absence of check valve 76. This higher velocity of regeneration solution flow provides the desired disturbing and stirring of the granular water treatment media 12C during the regenerating backflush stage.

Then, when the flow is reversed for service again, ball check valve 76 spontaneously opens so that the flow from media 12C through slots 60 and downwardly through aperture 64 can take place. Hence, the flow collector/distributor of FIG. 5 exhibits high capacity flow downwardly and outwardly for processed water, but at the same time, in the backflush step, high flow velocities through flow collector/distributor 53 may be achieved even though the flow volume is low.

Turning to FIG. 6, a plan view is shown of another design of flow collector/distributor of this invention. FIG. 6 is a bottom plan view, with flow collector/distributor 80 typically positioned at the bottom end of a water treatment tank, with outlet port 82 penetrating through the bottom wall of the tank. Header pipe 84 is connected to a plurality of lateral pipes 86, 88 which occupy the interior of the treatment tank and are typically buried in granular water treatment media 12D. Lateral pipes 86 may be of a design similar to any of the designs of FIGS. 2 through 4, carrying slots 90 of the same type and a check valve system 92 for purposes similar to that of the previous embodiment. As one difference, lateral pipes 86 are connected to header pipe 84 rather than directly to an aperture through the tank wall. Check valves 92, of any desired design, permit inward flow from laterals 86 to header 84, while preventing corresponding outward flow.

Lateral pipes 88 may be similar in design to lateral pipes 86 except that they do not carry a check valve. Accordingly, the flow of processed water may take place from the water treatment media 12D into laterals 86, 88, with flow taking place through slots 90 of all laterals. The processed water is collected through header 84 from laterals 86, 88, and passes out of the tank through port 82.

However when the water treatment media 12D is being regenerated through backflushing, regeneration solution passes into port 82 to flow into header line 84 and then into selected laterals 88. Check valves 92 prevent such backflushing flow into laterals 86. Thus, on backflushing, the flow of solution takes place substantially entirely through laterals 88 only, and not laterals 86, so that the flow velocity of the regeneration solution may be elevated to a desired degree, even though the flow volume is much less than the maximum available flow volume of the system in normal flow.

Figure 7:
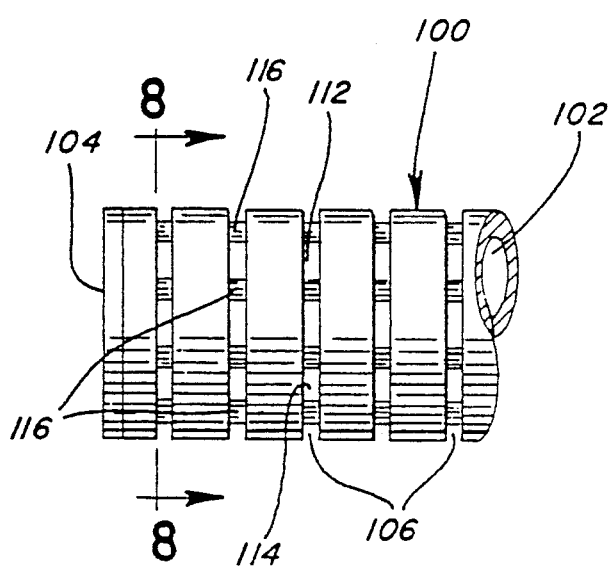
FIG. 7 is a fragmentary, enlarged plan view of a design of tubular radial flow conduit or "lateral" that may be used in any of the embodiments of FIGS. 2-6 of this invention.

Referring to FIGS. 7 and 8, a tubular water collection or delivery member similar to radially extending flow conduits 30, 32, or lateral pipes 86, 88 is disclosed. Hollow tubular housing 100 of the conduit or pipe defines a bore 102 and a closed outer end 104, being used as shown, for example, in previous embodiments of this application. As before, tubular housing 100 defines a plurality of slots 106 for flow communication between the exterior of housing 100 and the bore 102 thereof, so that water may flow either inwardly or outwardly through slots 106 for flow communication between a container with granular ion exchange media or the like, and the interior of a collector/distributor 22, for example as generally shown in FIG. 1. Slots 106 extend circumferentially about the tubular housing 100.

As shown in FIG. 8, circumferential slots 106 are of less depth than the thickness of the wall 108 of housing 100, the depth of slot 106 being indicated by vertical lines 110, and being typically less than half the thickness of housing wall 108.

A pair of apertures 112, 114 are provided, which apertures extend from the respective slots 106 inwardly, completely through housing wall 108 to communicate with bore 102 of housing 100. In the specific embodiment shown, two apertures 112, 114 are provided for each annular slot 106, with the two apertures being positioned about 120 degrees apart as shown in FIG. 8. However, other arrangements and numbers of apertures may also be used. For example, three apertures, equidistantly positioned 120 degrees apart from each other, may be used as well.

The advantage of this type of slot arrangement is that the individual slots 106 are fed by the respective apertures 112, 114. Apertures 112, 114 are no wider in the axial direction of tubular housing 100 than the respective slots 106. Hence, even if a large piece of granular material blocks the area immediately radially outwardly of one of the apertures 112, 114, this has little effect on the flow capacity of the slot and its apertures, since the apertures can feed liquid to a slot 106, causing the liquid to circulate circumferentially about the slot until it finds space to migrate outwardly, percolating through the granular ion exchange resin material or the like in which housing 100 may be embedded.

Accordingly, the particular slots of this invention provide a system in which the pressure drop of the flow path may be minimized, even when housing 100 is embedded in granular material that is only slightly larger than the width of slot 106. Thus, the presence of fewer slots 106 of this invention in a header or the like may be needed, when compared with prior art systems, in order to provide a desired, low pressure drop for fluid flowing through the respective slots 106 in either direction.

The slots of this invention may be used in any desired fluid flow apparatus for the treatment of processed or waste water, and it also may be used in chemical processing material or other uses including non-aqueous systems.

The ends of each aperture 112, 114 are respectively defined by inner and outer wall sections 118, 120 which preferably form an angle of no more than about 60 degrees to each other. As specifically shown in FIG. 8, the ends of slots 112, 114 are each partly defined by a pair of outer end wall sections 116 which represent surfaces that remain on the tubular housing after a transverse, chordal cut has been made by an appropriate tool. The inner end wall sections 118 are then defined by the remaining wall that defines the original bore 102 of tubular housing 101. The respective surfaces 116, 118 come together to form an angle 120 as shown which, in fact, is substantially less than 60 degrees in the specific embodiment shown.

Since it is preferable to manufacture apertures 112, 114 by means of a straight, chordal cut through the respective slots 106, it is also preferred that the outer end wall sections 116 of both ends of each aperture 112, 114 are generally coplanar to each other, which is the result of such a cordial cut. In a broader sense, it is specifically preferred for the outer end wall sections 116 to exhibit at least some outward divergence, relative to apertures 112, 114, to provide freer and better flow characteristics of fluids between slots 106 and the bore 102 of housing 100.

The above has been offered for illustrative purposes only, and is not intended to limit the scope of the invention of this application, which is as defined in the claims below.

That which is claimed is:

1. A flow collector/distributor for a water treatment tank, which comprises: a tubular housing positioned to provide fluid communication through a wall of a water treatment tank to provide flow communication between the tank interior and the tank exterior, a plurality of slots defined in said tubular housing and positioned to communicate with the tank interior when the collector/distributor is seated in the tank wall, said slots being of a width which is narrow enough to permit water flow therethrough while substantially preventing passage therethrough of water treatment material present within said tank; said slots defining slot portions facing outwardly of said housing that are of less depth than a thickness of a housing wall that defined them, and at least one aperture extending from each of said slot portions completely through said housing wall to provide flow communication between the outer slot portions and the interior of said housing; and one-way valve means permitting water flow through all of said slots from the tank interior through said collector/distributor to the tank exterior, while preventing water flow through some but not all of said slots from the tank exterior through said collector/distributor to the tank interior.

2. The flow collector/distributor of claim 1 in which said one-way valve means comprises at least one ball-type check valve.

3. The flow collector/distributor of claim 1 in which said one-way valve means comprises at least one flapper type check valve.

4. The flow collector/distributor of claim 1 in which said one-way valve means comprises at least one duckbill type check valve.

5. The flow collector/distributor of claim 1 in which said housing comprises a stack of secured rings, said rings defining said slots between them, said one-way valve means being positioned to control water flow through a majority of said slots.

6. The flow collector/distributor of claim 1 in which said housing comprises a central manifold chamber connected to a plurality of flow conduits extending radially outwardly from said manifold chamber, said flow conduits each defining a number of said slots, at least one of said flow conduits also carrying said one-way valve means, to control said water flow through its own slots.

7. The flow collector/distributor of claim 1 in which said housing comprises a central manifold header conduit connected to lateral flow conduits, a plurality of said lateral flow conduits each having a number of said slots.

8. The flow collector/distributor of claim 1 in which said slots each have a width of 0.005 to 0.03 inch.

9. The flow collector/distributor of claim 1 in which said at least one aperture is of essentially the width of its associated outer slot portion and has ends formed by inner and outer end wall sections forming an angle of no more than 60 degrees to each other.

10. The flow collector/distributor of claim 9 in which said slots are annular in shape.

11. In a water treatment tank which defines flow collector/distributors communicating between the tank interior and tank exterior, the water treatment tank containing water treatment material, the improvement comprising, in combination: at least one flow collector/distributor defining a housing positioned to provide fluid communication through a wall of the water treatment tank to provide flow communication between the tank interior and the tank exterior; a plurality of slots defined in said housing and positioned to communicate with the tank interior with the collector/distributor being seated in the tank wall, said slots being of a width which is narrow enough to permit water flow therethrough while substantially preventing passage therethrough of water treatment material present within said tank; said slots defining slot portions facing outwardly of said housing that are of less depth than a thickness of a housing wall that defines them, and at least one aperture extending from each of said slot portions completely through said housing wall to provide flow communication between said outer slot portions and the interior of said housing; and one-way valve means permitting water flow through said slots from the tank interior through said collector/distributor to the tank exterior, while preventing water flow through some but not all of said slots from the tank exterior through said collector/distributor to the tank interior.

12. The water treatment tank of claim 11 in which said second flow collector/distributor tank extends through a lower portion of the wall of said water treatment tank.

13. The water treatment tank of claim 12 in which said slots have a width of 0.01 to 0.03 inch.

14. The water treatment tank of claim 12 in which said housing comprises a central manifold chamber connected to a plurality of flow conduits extending radially outwardly from said manifold chamber, said flow conduits each defining a number of said slots, at least one o said flow conduits also carrying one-way valve means to control said water flow through its own slots.

15. The water treatment tank of claim 12 in which said housing comprises a stack of secured rings, said rings defining said slots between them, said one-way valve means being positioned to control water flow through a majority of said slots.

16. The water treatment tank of claim 12 in which said housing comprises a central manifold header conduit connected to lateral flow conduits, a plurality of said lateral flow conduits each having a number of said slots.

17. The water treatment tank of claim 12 in which said one-way valve means comprises at least one ball-type check valve.

18. The water treatment tank of claim 12 in which said one-way valve means comprises at least one swinging partition-type check valve.

19. The water treatment tank of claim 12 in which said one-way valve means comprises at least one duckbill type check valve.

20. The water treatment tank of claim 11 in which said aperture is of essentially the width of its associated outer slot portion and has ends formed by inner and outer end wall sections forming an angle of no more than 60 degrees to each other.

21. The water treatment tank of claim 20 in which said slots are annular in shape.

22. In fluid treatment apparatus comprising a housing having a wall with at least one slot means, said housing positioned to provide fluid communication through a wall of a water treatment tank to provide flow communication between the housing exterior and the tank and housing interior, the improvement comprising, in combination:

said slot means defining a slot portion facing outwardly of said housing wall and of less depth than the thickness of said wall, and at least one aperture contained within said slot portion and extending from said slot portion completely through said housing wall to provide flow communication between said outer slot portion and the interior of said housing.

23. The apparatus of claim 22 in which the slots are annular in shape and define a plurality of said apertures in spaced relation to each other.

24. The apparatus of claim 22 in which said aperture is of essentially the width of its associated slot portion and has ends formed by inner and outer end wall sections forming an angle of no more than 60 degrees to each other.

25. The apparatus of claim 24 in which said outer end wall sections of both ends of said aperture are generally coplanar to each other.

26. In fluid treatment apparatus comprising a flow collector/distributor positioned to provide fluid communication between the exterior and the interior of a wall of a tank for providing or withdrawing water from the tank through the collector/distributor, said collector/distributor defining a tubular housing having a wall with at least one annular slot for flow communication between the housing exterior and interior, the improvement comprising, in combination:

said slot defining a slot portion facing outwardly of said housing wall and of less depth than the thickness of said wall, and at least one aperture contained within said portion and extending from said slot portion completely through said housing wall to provide flow communication between said outer slot portion and the interior of said housing.

27. The apparatus of claim 26 in which a plurality of said annular slots are provided in spaced relation to each other on said housing.

28. The apparatus of claim 27 in which a plurality of apertures are present in each slot, said apertures in each slot being in spaced relation to each other and communicating with the housing interior.

29. The apparatus of claim 28 in which said apertures are of essentially of the width of the associated slot, said apertures having ends formed by inner and outer end wall sections forming an angle of no more than 60 degrees to each other.

30. The apparatus of claim 29 in which said outer end wall sections of both ends of each of said apertures are generally coplanar to each other and in chordal relation to the flow collector/distributor.

* * * * *